United States Patent [19]

Henderson

[11] Patent Number: 4,971,610

[45] Date of Patent: Nov. 20, 1990

[54] DEWPOINT DEMAND CONTROL SYSTEM FOR REGENERATIVE DRYER

[76] Inventor: Terry D. Henderson, 1100 Queens Ct., Naperville, Ill. 60540

[21] Appl. No.: 233,558

[22] Filed: Aug. 18, 1988

[51] Int. Cl.$^5$ ..................... B01D 53/04

[52] U.S. Cl. ..................... 55/162; 55/163; 55/179; 55/270; 55/275; 55/387

[58] Field of Search ..................... 55/20, 33, 161–163, 55/179, 180, 208, 275, 387, 290

[56] References Cited

U.S. PATENT DOCUMENTS

| | | | |
|---|---|---|---|
| 1,863,656 | 6/1932 | Hartman | 55/162 |
| 2,569,537 | 10/1951 | Robbins | 55/163 X |
| 3,144,314 | 8/1964 | Jackson | 55/275 X |
| 3,448,561 | 6/1969 | Seibert et al. | 55/20 |
| 4,127,395 | 11/1978 | McKey et al. | 55/20 |
| 4,322,223 | 3/1982 | Christel, Jr. | 55/33 X |
| 4,351,649 | 9/1982 | Owens et al. | 55/162 |
| 4,504,286 | 2/1985 | Carlisle et al. | 55/20 |
| 4,627,860 | 12/1986 | Rowland | 55/162 |
| 4,783,432 | 11/1988 | Settlemyer | 55/33 X |

FOREIGN PATENT DOCUMENTS

| | | | |
|---|---|---|---|
| 55-155725 | 12/1980 | Japan | 55/163 |
| 55-155726 | 12/1980 | Japan | 55/163 |
| 55-159828 | 12/1980 | Japan | 55/163 |
| 57-12917 | 7/1982 | Japan | 55/33 |

*Primary Examiner*—Robert Spitzer
*Attorney, Agent, or Firm*—R. A. Blackstone, Jr.

[57] ABSTRACT

A dewpoint demand control apparatus comprises a probe interpoed in a dry air outlet of a regenerative dryer and responsive to the moisture content of the air at the dry air outlet for producing a corresponding moisture signal, a moisture analyzer and control responsive to the probe for producing a dry control signal when the moisture level sensed by the probe is below a preselected level and for generating a wet control signal when the moisture level at the probe reaches or exceeds the preselected level; and a power switch coupled with the power supply for the tower electrical control system and responsive to the dry control signal being present at the time of operation of the tower reversal control for reversal between the on-stream and off-stream towers for interrupting the power supplied to the tower reversal control to thereby prevent switching on-stream of the previously regenerated one of the towers, and the power responsive to the wet control signal for re-energizing the power supply for the tower electrical control system to thereby permit a previously interrupted reversal of towers and place the previously regenerated tower on-line and for returning control of the on-stream and off-stream time of the towers to the tower reversal control.

6 Claims, 3 Drawing Sheets

DEWPOINT DEMAND CONTROL SYSTEM FOR REGENERATIVE DRYER

BACKGROUND OF THE INVENTION

The invention is directed generally to control systems for regenerative type dryer apparatus of the type utilized in drying a stream of compressed air from a compressor, prior to feeding a compressed air to downstream utilization equipment.

Regenerative dryers normally include at least two drying towers, in which the compressed air is passed through a drying medium or desiccant to remove moisture therefrom. As the drying medium or desiccant in one tower becomes saturated, it is necessary to take the tower off line and redirect the stream of air to the other drying tower or towers. Alternatively, controls may permit bypassing the towers and feeding air directly to the downstream equipment, in the event it is determined that drying is not required.

Accordingly, most regenerative dryers systems include one or more towers, as well as fairly complex valving and control systems for determining which tower(s) is (are) on line at a given time and which tower(s) is (are) being regenerated. Various control systems have adopted various timing schemes for switching between towers, to allow sufficient time for regeneration of the desiccant or drying medium in each tower, from time to time, and in an effort to assure a continuous flow of dry air to the downstream utilization equipment.

However, the energy requirements for operation under the control of such time-based systems is substantial. For example, heated types of drying systems wherein the desiccant is heated to perhaps 350° F. or higher, require considerable energy in their operation. However, even so-called heatless type dryers have significant energy costs in their operation. That is, these latter dryers may require up to 15% or more of the dried outlet gasses or air stream to purge the saturated desiccant during the regenerating portion of the cycle. Accordingly, the heatless dryers with these purge losses to the system frequently cost as much or even substantially more to operate than the heated dryers.

A third type, so-called heat of compression type dryers, also require heat energy to regenerate the saturated desiccant. However, in most cases the use of the heat of compression dryers is confined to applications where there is already sufficient heat in the compressed air stream and no significant amount of additional heat or regeneration energy is required.

In theory, proper selection of a regenerative dryer for a compressed air or other gas handling system requiring drying of the air or gas stream normally requires a drying system having sufficient capacity to handle a "worst case" situation. This means that the dryer is somewhat oversized for normal operating loads and, it follows, is significantly oversized in the event of reduced drying demands on the system. Accordingly, it will be seen that the energy usage may far exceed the actual drying requirements when such an oversized dryer is selected for use with the typical compressed air or other gas handling system.

Most regenerative systems heretofore in use involve a timing system for alternating between on line and off line time of the two dryers, in some preset cycle. Each time the cycle reverses and one tower begins a regeneration cycle, significant energy is consumed. Moreover, valves, desiccant and other components experience wear and tear in repeated operation. Yet, it will be appreciated from the foregoing discussion that the use of some preset timing cycle will also of necessity involve more frequent switching than necessary to accommodate "worst case" moisture levels. That is, the system will switch somewhat too frequently under normal operation conditions and significantly too frequently in reduced loading situations. Moreover, it has been shown that significant dewpoint or moisture spikes may well occur with such switching systems. In fact, most dryers of this type exhibit elevated dewpoints or moisture content of the outlet air for several minutes following a tower reversal.

Accordingly, it has heretofore been proposed to add dewpoint demand systems to existing preset timing-based cycling systems of the foregoing type. Such a system would ideally delay the reversal or switching between towers while the moisture content or dewpoint of the output stream is within acceptable levels, and permit the reversal or switching between towers when the dewpoint or moisture content exceeds acceptable levels.

However, the dewpoint demand systems heretofore utilized have been custom-designed for use with only a single manufacturer's regenerative dryer system, and perhaps for use with only one model or line in a given manufacturer's line of regenerative dryer systems. Hence, most manufacturers limited their dewpoint demand systems to factory installation as original equipment on their own regenerative dryer systems only. Therefore dewpoint demand controller systems have heretofore been generally unavailable for field installation or retrofitting on existing systems, due to the complexity of coordinating the dewpoint demand system and its components with the existing dryer system control components.

That is, field-installation of a dewpoint demand control system usually required altering the dryer control system significantly, including alteration of the dryer's cycle timer or programmer apparatus. The foregoing considerations were heretofore thought to make in-the-field retrofitting of a dewpoint demand system difficult or impossible. Moreover, it has heretofore been considered that the foregoing considerations made it impossible to offer a dewpoint demand control system which was essentially "universal" in its application, considering the immense variety of regenerative dryer and control systems employed by the many manufacturers offering such systems.

OBJECTS AND SUMMARY OF THE INVENTION

Accordingly, it is an object of this invention to provide a dewpoint demand control system for a regenerative dryer which is substantially universal in its application such that it can be readily and easily installed in the field in existing regenerative dryer apparatus.

Briefly, and in accordance with the foregoing discussion and object, a dewpoint demand control apparatus is provided for controlling operation of any of a broad variety of regenerative dryers of the type having two drying towers, valve means for alternatively selecting one of the two towers for placement on-stream for drying air and the other tower off-stream for regeneration, or for bypassing both of said towers, a dry air outlet for connection by said valve means to the selected one of said two towers or to an air inlet for delivering air to downstream equipment, and an electrical control system including tower reversal control means for controlling the on-stream and off-stream time of each of the two towers and reversal therebetween, such that when one tower is on-stream, the other tower is off-stream regenerating, and vice-versa, and tower control power supply means for operating said tower electrical control system including said tower reversal control means. The dewpoint demand control apparatus comprises probe means interposed in said dry air outlet of said regenerative dryer; said probe means being responsive to the moisture content of the air at said dry air outlet for producing a corresponding moisture signal; moisture analyzer and control means responsive to said probe means for producing a dry control signal when the moisture level sensed by the probe means is below a preselected level and for generating a wet control signal when the moisture level at said probe means reaches or exceeds said preselected level; and power switching means coupled with said power supply means for said tower electrical control system and responsive to said dry control signal being present at the time of operation of said tower reversal control means for reversal between the on-stream and off-stream towers for interrupting the power supplied to said tower reversal control means to thereby bypass both towers and prevent switching on-stream of the previously regenerated one of said towers, and said power switching means being responsive to said wet control signal for re-energizing said power supply means for said tower electrical control system to thereby permit a previously interrputed reversal of towers and place the previously regenerated tower on-line and for returning control of the on-stream and off-stream time of the towers to the tower reversal control means.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF THE ILLUSTRATED EMBODIMENT

Prior to turning to a detailed description of the preferred form of the invention illustrated herein and its operation in connection with a regenerative dryer system, it will be instructive to initially review the manner in which the dewpoint demand control apparatus of the invention operates.

The dewpoint demand control apparatus of the invention is advantageously designed to be easily and quickly integrated into almost any regenerative dryer control system. Once in operation, the apparatus of the invention constantly monitors the dewpoint or moisture content of the air or other gas leaving the regenerative dryer system. If, at the end of regeneration of one of the at least two system drying towers the monitored moisture content is determined to be below a user adjustable set point, the apparatus of the invention prevents the (therefore) unnecessary tower reversal (and thus saves the energy consumed in tower regeneration) by interrupting power to the regenerative dryer's control system. This allows the dryer system to in effect be placed on "hold" or "standby" condition for so long as the exiting air stream is below the user adjustable set point in its moisture content.

The regenerative dryer system will remain in this standby condition with a previously regenerated tower available until the dewpoint or moisture content of the outlet rises above the user selected set point or limit. At this time, the apparatus of the invention re-energizes the dryer control system so as to permit the tower reversal controls to complete operation and switch in the previously regenerated tower which has been held in reserve or standby condition into the air stream. The regenerative dryer control system in essence returns to operation under control of its own timer or other control components in accordance with its own control cycle or program.

When it again comes time for the dryer system to switch or reverse drying towers, the foregoing situation again applies. That is, if the air stream being monitored by the apparatus of the invention is still above the user selected set point in its moisture content or dewpoint, the regenerative dryer control system is permitted to continue its cycle and switch to the regenerated tower. If, however, the output air stream is once again below the user selected set point, the power is again removed from the dryer control system, until such time as the newly regenerated tower is again required, due to the output air stream again exceeding the user selected set point in its dewpoint or moisture content.

Figure 1:
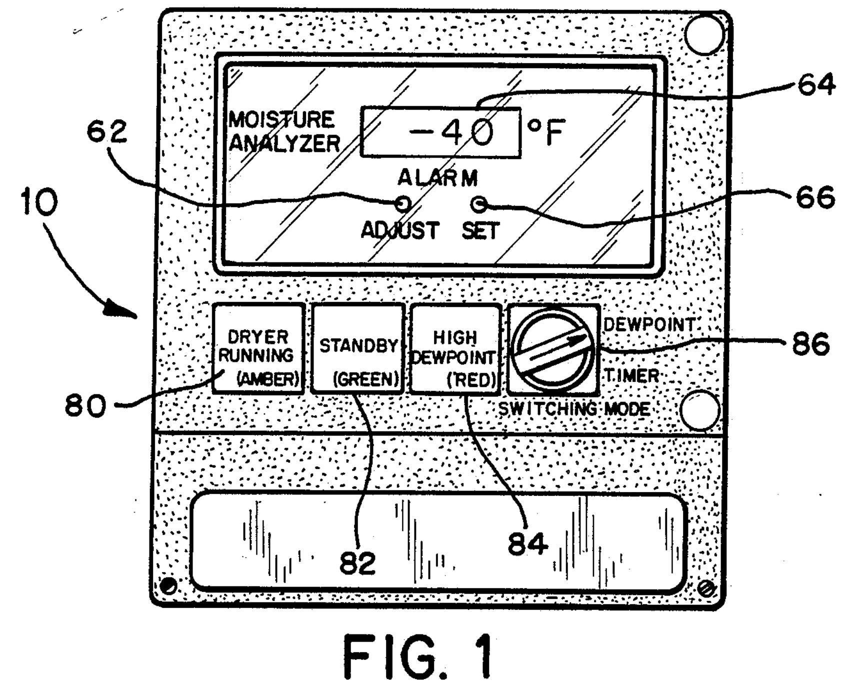
FIG. 1 is a front elevation of a front panel of a dewpoint demand apparatus in accordance with the present invention.

In accordance with the foregoing operational discussion, and referring now more specifically to the drawings, a console or control panel of a dewpoint demand control apparatus in accordance with the invention is illustrated in FIG. 1. The control console 10 includes suitable controls and displays or indicators, to be more fully described hereinbelow, for operation of the same in connection with a regenerative dryer.

Figure 2:
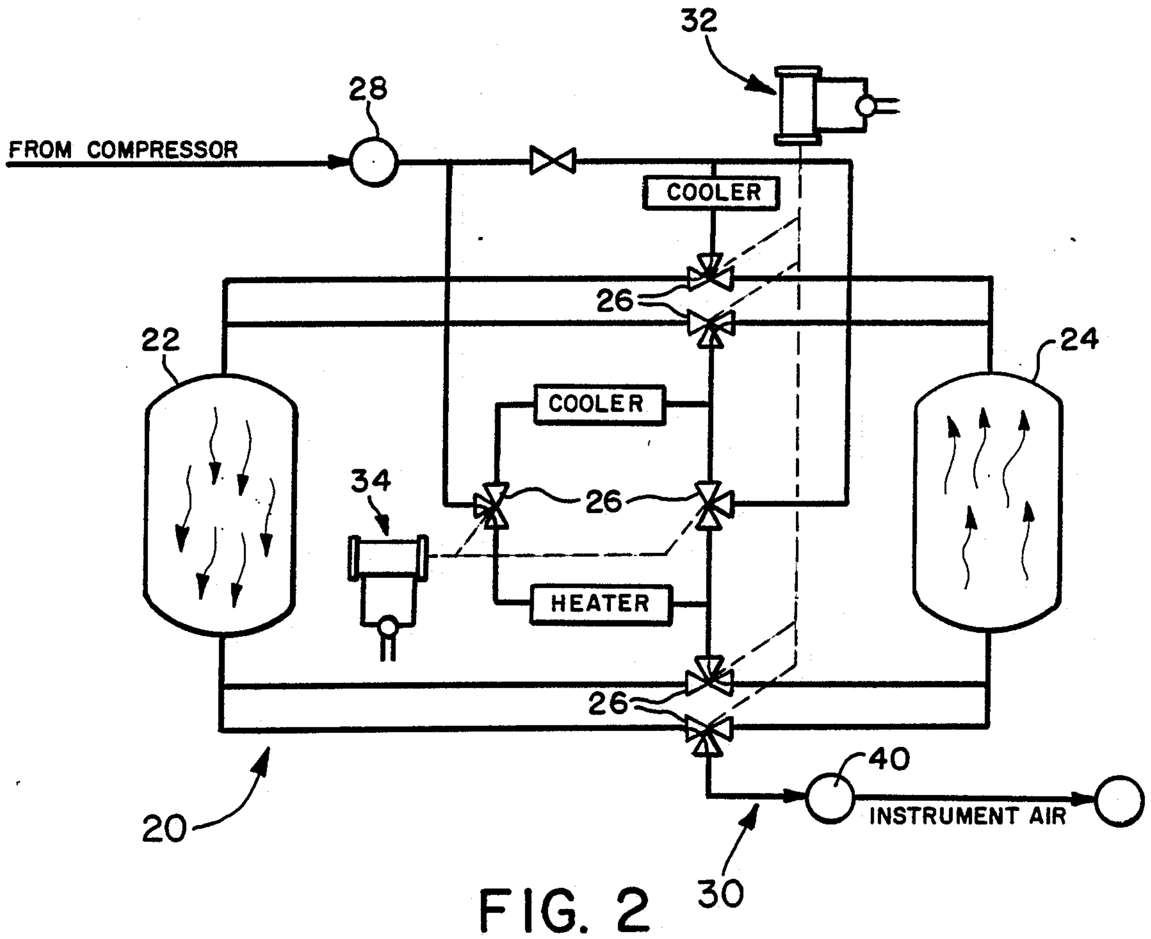
FIG. 2 is a system schematic diagram of a regenerative heat of compression dryer, exemplary of one of the many types of regenerative drying system with which the apparatus of the invention may advantageously be employed.

In this connection, reference is invited to FIG. 2 wherein one type of regenerative dryer with which the invention may be utilized is illustrated for purposes of example only. The dryer in FIG. 2, designated generally by reference numeral 20 is a heat of compression type dryer. However, it should be understood that the invention is not so limited, but rather the dewpoint demand control apparatus of the invention may be utilized with any of a broad variety of regenerative dryers.

Generally speaking, the apparatus of the invention is useful with any regenerative dryer, such as dryer 20, of the type having at least two drying towers 22, 24 and a valving system or valve means 26 for alternatively selecting one of the two towers for placement on-stream for drying air or for bypassing both of the towers. The dryer has an air inlet 28 from an air compressor and an air outlet 30. The valving system or valve means 26 are arranged to direct or "switch" compressed air from the compressor to one of the two towers 22, 24 or alternatively to bypass the two towers and feed the compressed air directly to the outlet 30, depending on the need for drying.

To this end, the dryer system includes an electrical control system, somewhat diagrammatically illustrated at 32, 34 which includes tower reversal control means for controlling the on-stream and off-stream time of each of the two towers 22, 24 and for controlling reversal therebetween. This control system and the valve means 26 are such that when one tower is on-stream the other tower is off-stream regenerating, and vice-versa. Some power supply or power supply means (not shown in FIG. 2) is provided for operating the electrical control system and tower reversal control means in this fashion.

Figure 3:
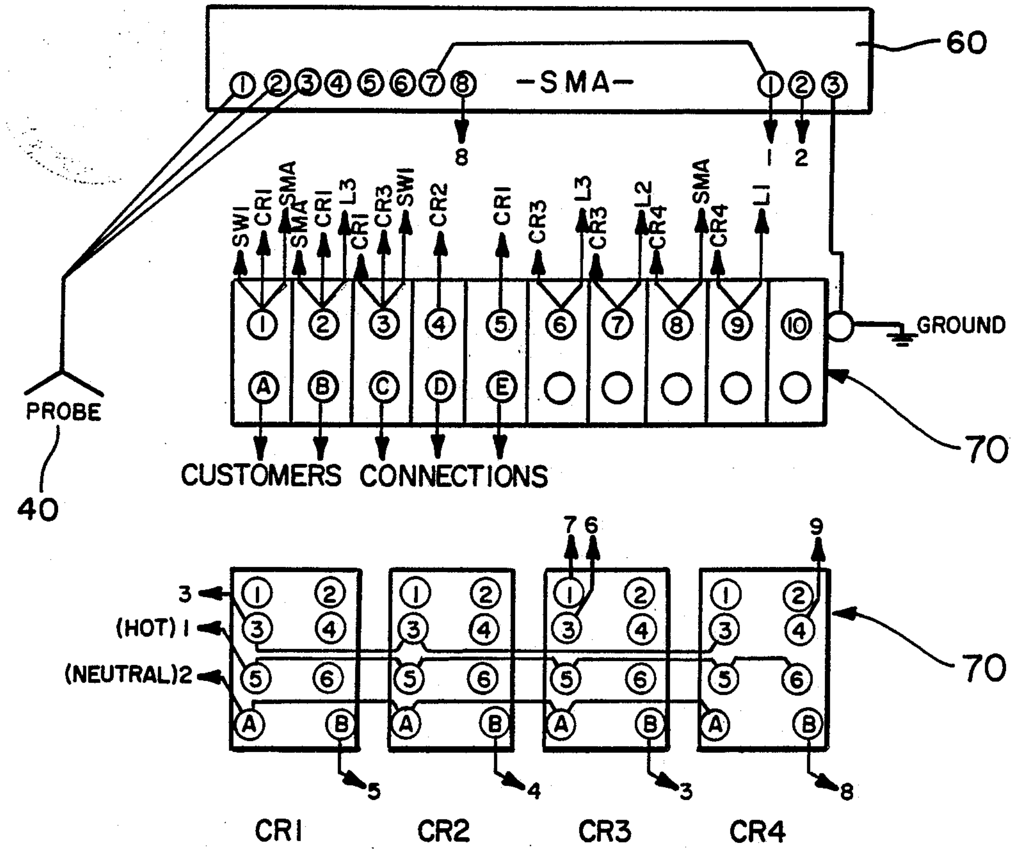
FIG. 3 is an electrical connection diagram, illustrating the simplicity with which the apparatus of the invention may be retrofitted with a regenerative dryer, such as the dryer of FIG. 2, and the electrical control system therefor.
Figure 5:
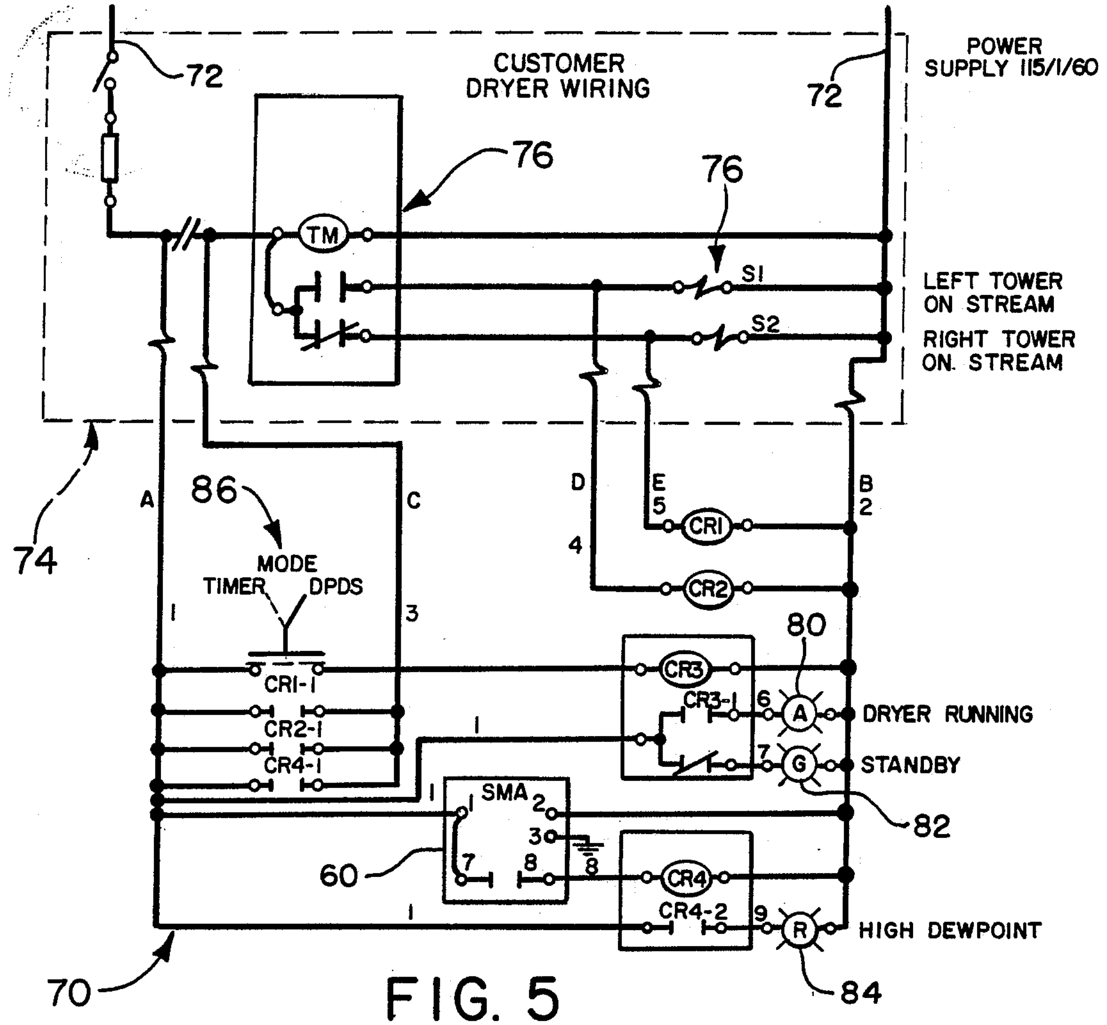
FIG. 5 is a circuit schematic diagram illustrating in further detail the electrical components of the apparatus of the invention and its interconnection with the regenerative dryer electrical system.

Referring now also to FIGS. 3 and 5, the dewpoint demand control apparatus of the invention includes a probe or probe means 40 interposed in the dryer outlet 30 of the regenerative dryer. This probe means is a moisture probe which is responsive to the moisture content of the air at the outlet 30 for producing a corresponding usable moisture level-related signal.

Figure 6:
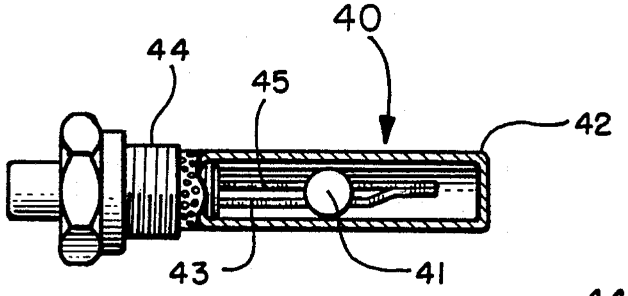
FIG. 6 is an enlarged elevation, partially broken away, showing a preferred form of moisture probe useful with the apparatus of the invention.
Figure 7:
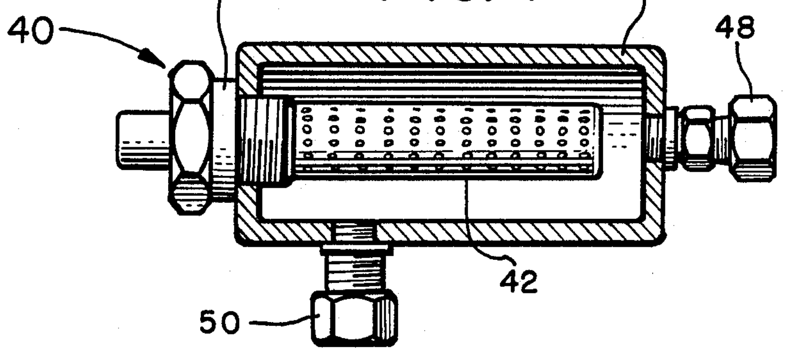
FIG. 7 is a sectional view, illustrating a preferred form of housing and fittings for mounting the probe of FIG. 6 for monitoring the moisture content of the outlet air of a regenerative dryer apparatus.

Referring briefly also to FIGS. 6 and 7, the probe means in accordance with a preferred form of the invention will be seen to comprise a housing 42 which is provided with a threaded, tool-engagable fitting 44. Preferably the housing 42 comprises a perforated screen for protecting the sensor components housed therein. The fitting 44 provides a convenient, tool-engagable means for threading the sensor 40 into a suitable sensor enclosure 46, which is shown in FIG. 7. The sensor enclosure 46 is preferably provided with further suitable fittings including an outlet fitting 48 and an inlet fitting 50 for connecting the same in line with the dryer apparatus outlet 30. Preferably, fitting 44 also includes suitable sealed or sealable means for feeding suitable electrical wires or cables to the electrical sensor component 41 contained in the housing 42.

The sensor component 41 in the probe 40 preferably comprise a specially anodized strip of aluminum which provides a porous oxide layer over which a very thin coating of metal is evaporated. The coating thus defines two electrodes of what is essentially an aluminum oxide capacitor. The sensor 41 is provided with electrical leads designated generally by reference numerals 43, 45. A preferred form of the probe 40 is available from Panametrics, Inc. of Waltham, Mass., and is sold under the trademark Panadry.

Returning now to FIGS. 3 and 5, the dewpoint demand control apparatus of the invention further includes a moisture analyzer and control means 60 (SMA). This moisture analyzer and control means 60 is preferably a moisture analyzer or "moisture meter" of the type also made by Panametrics, Inc. of Waltham, Mass. under the trademark Panadry. Each Panadry system comprises a matched moisture 60 analyzer and probe 40 (of the type described above with reference to FIGS. 6 and 7).

In accordance with the invention, the moisture analyzer and control means 60 is responsive to the signal from the probe means 40 for producing a "dry" control signal when the moisture level sensed by the probe means is below some preselected or preset level and for generating a "wet" control signal when the moisture level sensed by the probe means reaches or exceeds the preselected or preset level.

The moisture analyzer 60 also includes an adjustable dewpoint level selection means 62, which in the illustrated embodiment takes the form of a user-accessible "adjust" member on the face of the control panel 10 (see FIG. 1). A digital display 64 is provided in connection with this user adjustable member to indicate the dewpoint selected by manipulation thereof. When the desired preset dewpoint has been reached on the display 64, an additional control 66 is manipulated to set in the desired dewpoint, and thereby produce a signal internally of the analyzer which corresponds to the preselected moisture level at the probe means above which level a wet control signal is generated and below which level a dry control signal is generated.

The apparatus of the invention also comprises a power switching means, designated generally by reference numeral 70 in FIG. 5, which is in operation connected in circuit with the power supply 72 for the tower electrical control system 74. This power switching means 70 is responsive to the dry control signal being present at the time of operation of the tower reversal means 76 for switching between the on-stream and off-stream towers for interrupting the power which is supplied to the tower reversal control means 76. This interruption of power to the tower reversal control means prevents the switching on-stream of the previously regenerated one of the two towers. Conversely this also prevents the switching off-stream of the other of the two towers for regeneration.

It should be appreciated that the above-described mode of operation in effect puts the regenerative drying system in an idle or "standby" mode, such that substantial power or energy savings are realized. That is, the regenerated one of the two towers is not utilized prior to being actually needed to control the moisture level or dewpoint of the compressed air, and at the same time, the other tower is not switched off-line and regenerated, which as discussed above, may consume substantial energy. That is, when the compressed air is already below the desired moisture level, there is no need to consume energy in tower regeneration.

On the other hand, if the wet control signal is present at the time of tower reversal, the power switching means does not operate as described above to interrupt powers, but merely permits the tower reversal control means to operate in its normal fashion. However, when the power has once been interrupted by the power switching means, the power switching means is thereafter responsive to occurrence of the wet control signal for re-energizing the power supply means for the tower electrical control system. This will permit the previously interrupted reversal of towers to take place, thereby putting the previously regenerated tower online, taking the other tower off-line for regeneration, and returns control of the on-stream and off-stream time of the towers to the tower reversal control means or system 76.

Advantageously, the dewpoint demand control apparatus of the invention may be relatively simply and readily retrofitted with existing or in-the-field regenerative dryers. For example, in the embodiment illustrated in FIG. 5, it will be noted that there are only five wiring connections (A, B, C, D and E) required to achieve full interconnection for full operation as described above between the electrical systems of the dryer and of the dewpoint demand control system, respectively.

In accordance with a further feature of the illustrated embodiment, the moisture analyzer means or portion of the analyzer and control means is responsive to the moisture signal from the probe means for producing a display signal which corresponds to the moisture level detected at probe. The moisture analyzer display portion 64 is also adapted to respond to this display signal for producing an observable indication of the moisture level at the probe. In the illustrated embodiment, the display 64 displays the dewpoint in terms of degrees Fahrenheit.

Further features of the illustrated embodiment, which are shown for example in FIG. 1, include respective indicators for indicating when the dryer is running, when the dryer is in the standby mode, and for indicating a high dewpoint reading, that is, at or above the preset level. These three indicators take the form of respectively colored backlighted panels or display windows 80, 82, 84, as shown in FIG. 1.

The respective dryer running and standby indicators are responsive to energization and deenergization of the tower electrical control system for producing the corresponding indications, that is, for indicating whether the dryer system is running or in a standby mode. The high dewpoint indicator 84 is responsive to the wet control signal for producing an observable indication, that is, for indicating that the moisture level at the probe has reached or exceeded the preselected or preset level.

A mode selector switch permits switching of the dewpoint demand control apparatus in or out of the system. This "switching mode" control switch is indicated at reference numeral 86 in FIG. 1. The "dewpoint" ("DPDS" in FIG. 5) position of the switch causes the dewpoint demand control system to operate in conjunction with the dryer timer control system as described above. The "timer" position of switch 86 effectively switches the dewpoint demand control system out of the circuit and permits the dryer circuitry to operate in its customary manner.

Figure 4:
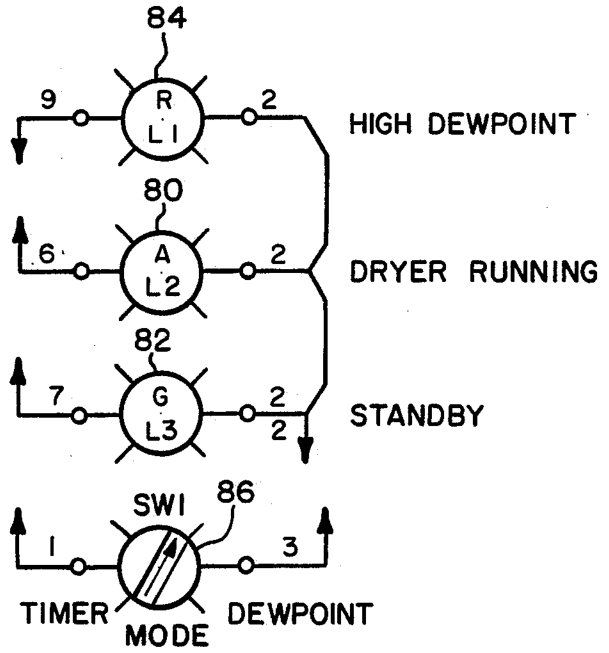
FIG. 4 is an enlarged partial schematic diagram illustrating a front panel control selection switch and system operation indicators of the front panel of the apparatus of FIG. 1.

Further details of the connections of the various parts described above and their operation are shown in circuit schematic form in FIG. 5, to which reference is also invited. The components include a plurality of coil-type relays (e.g., CR+CR2, etc.) and their respective normally open (e.g., CR1-1) and normally closed (e.g., CR3-2) sets of contacts. A further connection diagram is also indicated in FIG. 3, further illustrating the simplicity of the five connections to be effected between the dewpoint demand control apparatus and the existing dryer wiring. FIG. 4 illustrates additional details of the wiring of the mode selector switch and the respective indicators 80, 82 and 84.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A dewpoint demand control apparatus for controlling operation of any of a broad variety of regenerative dryers of the type having two drying towers, valve means for alternately selecting one of the two towers for placement on-stream for drying air and the other tower off-stream for regeneration, or for bypassing both of said towers, a dry air outlet for connection by said valve means to the selected one of said two towers or to an air inlet for delivering air to downstream equipment, and an electrical control system including tower reversal control means for controlling the on-stream and off-stream time of each of the two towers and reversal therebetween, such that when one tower is on-stream, the other tower is off-stream regenerating, and vice-versa, and tower control power supply means for operating said tower electrical control system including said tower reversal control means; said dewpoint demand control apparatus comprising: probe means interposed in said dry air outlet of said regenerative dryer; said probe means being responsive to the moisture content of the air at said dry air outlet for producing a corresponding moisture signal; moisture analyzer and control means responsive to said probe means for producing a dry control signal when the moisture level sensed by the probe means is below a preselected level and for generating a wet control signal when the moisture level at said probe means reaches or exceeds said preselected level; and override control means for selectively overriding said tower reversal control means and comprising power switching means coupled with said power supply means for said tower electrical control system and responsive to said dry control signal being present at the time of operation of said tower reversal control means for reversal between the on-stream and off-stream towers for interrupting the power supplied to said tower reversal control means to thereby prevent switching on-stream of the previously regenerated one of said towers, and said power switching means being responsive to said wet control signal for re-energizing said power supply means for said tower electrical control system to thereby permit a previously interrupted reversal of towers and place the previously regenerated tower on-line and for returning control of the on-stream and off-stream time of the towers to the tower reversal control means.

2. Apparatus according to claim 1 wherein said dewpoint demand control system comprises no more than five terminals requiring connection to predetermined points of the tower electrical control system for operation in cooperation therewith.

3. Apparatus according to claim 1 wherein said moisture analyzer and control means further includes analyzer means responsive to the moisture signal from the probe means for producing a display signal corresponding to the moisture level detected at said probe means and display means responsive to said display signal for producing an observable indication of said moisture level at said probe means.

4. Apparatus according to claim 1 wherein said moisture analyzer and control means include indicator means responsive to said wet control signal for producing an observable indication thereof, thereby indicating that the moisture end at the probe has reached or exceeded said preselected level.

5. Apparatus according to claim 1 wherein said moisture analyzer and control means includes respective dryer running and standby indicator means responsive to respective energization and deenergization of said tower electrical control system for producing respective corresponding observable indications thereof, thereby indicating whether the dryer system is running or in a standby mode.

6. Apparatus according to claim 1 and further including dewpoint level selection means for selecting said preselected level.

* * * * *